United States Patent
Fujiyama et al.

(10) Patent No.: US 7,029,220 B2
(45) Date of Patent: Apr. 18, 2006

(54) BAND SHAPED CONNECTED SCREWS WITH INVERSE SCREW THREADS

(75) Inventors: Takeo Fujiyama, Tokyo (JP); Junichi Tamura, Tokyo (JP); Mitsuhisa Machida, Tokyo (JP); Yasushi Nakagawa, Tokyo (JP)

(73) Assignee: Max Co., Ltd., Tokyo (JP)

( * ) Notice: Subject to any disclaimer, the term of this patent is extended or adjusted under 35 U.S.C. 154(b) by 0 days.

(21) Appl. No.: 10/490,155

(22) PCT Filed: Sep. 18, 2002

(86) PCT No.: PCT/JP02/09578

§ 371 (c)(1),
(2), (4) Date: Mar. 18, 2004

(87) PCT Pub. No.: WO03/027517

PCT Pub. Date: Apr. 3, 2003

(65) Prior Publication Data

US 2004/0240935 A1    Dec. 2, 2004

(30) Foreign Application Priority Data

Sep. 21, 2001 (JP) .............................. 2001-289424

(51) Int. Cl.
F16B 35/04     (2006.01)
B65D 85/24     (2006.01)

(52) U.S. Cl. .................. 411/413; 411/442; 206/344; 206/345

(58) Field of Classification Search ................ 411/442, 411/443, 412, 413; 206/343, 345, 347, 344
See application file for complete search history.

(56) References Cited

U.S. PATENT DOCUMENTS

| 867,552 A | * | 10/1907 | Bradford ...................... 301/87 |
| 3,031,670 A | | 5/1962 | Sillars |
| 3,256,661 A | * | 6/1966 | Fischer ........................ 52/373 |
| 3,885,669 A | * | 5/1975 | Potucek ..................... 206/338 |
| 4,653,244 A | * | 3/1987 | Farrell ..................... 52/745.21 |
| 4,836,372 A | * | 6/1989 | Shelton ...................... 206/344 |
| 5,839,332 A | | 11/1998 | Fujiyama et al. |
| 6,074,149 A | | 6/2000 | Habermehl et al. |
| 6,585,113 B1 | * | 7/2003 | Shiu ........................... 206/344 |
| 6,616,391 B1 | * | 9/2003 | Druschel ................. 411/387.2 |
| 6,666,638 B1 | * | 12/2003 | Craven ....................... 411/413 |

FOREIGN PATENT DOCUMENTS

| EP | 0870696 A1 | 10/1998 |
| JP | 8-284933 | 11/1996 |
| WO | WO95/29794 | 11/1995 |

* cited by examiner

Primary Examiner—Flemming Saether
(74) Attorney, Agent, or Firm—Morgan Lewis & Bockius LLP

(57) ABSTRACT

A plurality of screws (21) are aligned in parallel with each other, and head side portions (21b) of shaft portions (21A) of the screws are fixed, by a band (30) fixed to a strip sheet (31), to be band-shaped connected screws (20). Further, in the band-shaped connected screws (20), the head side portion (21b) of the shaft portion (21A) of each screw (21) is formed with an inverse screw thread (23) formed inverse direction to a screw thread (22) formed at the shaft portions (21A).

6 Claims, 7 Drawing Sheets

BAND SHAPED CONNECTED SCREWS WITH INVERSE SCREW THREADS

TECHNICAL FIELD

The present invention relates to band-shaped connected screws in which a plurality of screws are fixed to a strip sheet by a band to be connected.

BACKGROUND ART

Conventionally, band-shaped connected screws 1 as shown by FIG. 8 have been known. According to the band-shaped connected screws 1, shaft portions 3 of a plurality of screws 2 are welded to a resin strip sheet 4 by a resin band 5 to thereby connect the screws 2. The screw 2 includes a straight portion 3a which is not formed with a screw thread below a head portion 2a, and a screw portion 3b which is formed with a screw thread 6. The straight portion 3a is fixed by the band 5.

In such a band-shaped connected screws 1, since the straight portion 3a of the shaft portion 3 is fixed by the band 5, there poses a problem that the screw 2 is shifted in an up and down direction relative to the sheet 4.

Further, when the screw 2 of the band-shaped connected screws 1 is driven by a screw striker (not illustrated), the band 5 is cut while the head portion 2 of the screw 2 is riding over, and the screw 2 is detached from the sheet 4. However, a large load needs to apply to the screw 2 in cutting the band 5. Therefore, the load pressed by a piston needs to increase significantly by increasing a cylinder diameter of the screw striker and therefore, a reaction of the striker is increased and the operation of striking the screw becomes laborious.

Further, as shown by FIG. 9, there is proposed band-shaped connected screws 8 in which the screw 7 formed with the screw thread 6 at the straight portion 3a of the shaft portion 3.

Although the screw thread 6 is formed in the band-shaped connected screws 8, there is a possibility that the screw 7 is shifted in the up and down direction relative to the sheet 4. Further, the large load needs to apply to the screw 2 in cutting the band 5 even in the band-shaped connected screws 8. Further, when the screw 7 is screwed to members A, B by the screw striker as shown by FIG. 10, female screws Aa, Bb are formed at the members A, B, a pitch of a thread of the female screw Bb of the member B and a pitch of the screw threads 6 of the screw 7 are equal and therefore, the members A, B are not attracted to each other by the screwed screw 7 to thereby pose a problem that a performance of bringing the members A, B into close contact with each other is poor.

SUMMARY OF THE INVENTION

The invention has been carried out in view of the above-described situation and it is an object thereof to provide a band-shaped connected screws capable of reducing a load in cutting a band and improving a performance of bringing two members into close contact with each other.

In order to achieve the above-described object, a band-shaped connected screws of the invention characterized in aligning a plurality of screws in parallel with each other, fixing shaft portions on head side head portions of the screws to a strip sheet by a band to connect the screws, and forming inverse screw threads in a direction inverse to a direction of screw threads formed at the shaft portions of the screws on the head side portions of the shaft portions.

Figure 1:
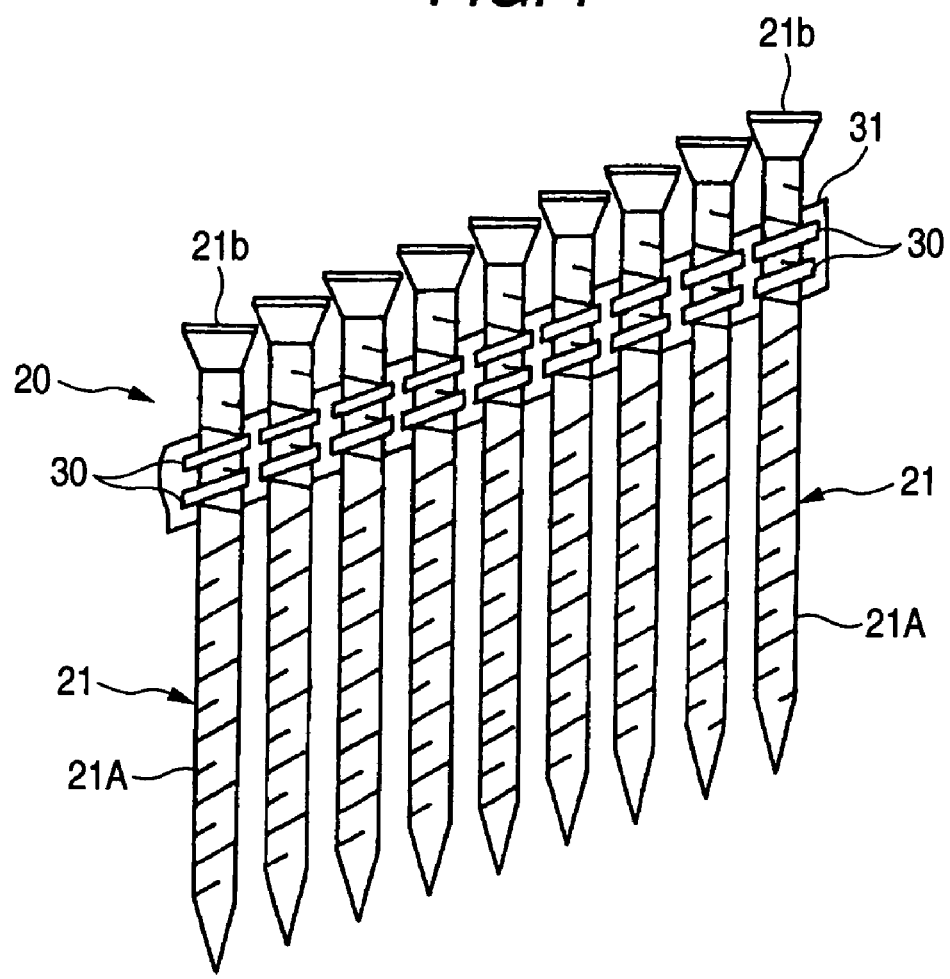
FIG. 1 is an explanatory view showing a constitution of band-shaped connected screws according to the invention.

Further, innotations in the drawings, numeral 20 designates a band-shaped connected screws, numeral 21 designates a screw, notation 21A designates a shaft portion, notation 21b designates a head portion, numeral 22 designates a screw thread, numeral 23 designates an inverse screw thread, numeral 30 designates a band, and numeral 31 designates a sheet.

DESCRIPTION OF THE PREFERRED EMBODIMENTS

An explanation will be given of embodiments of a band-shaped connected screws according to the invention in reference to the drawings as follows.

Figure 2:
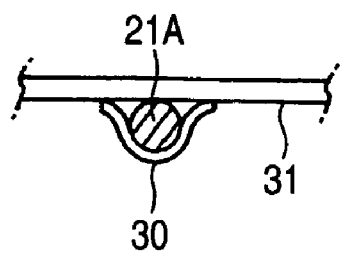
FIG. 2 is an explanatory view showing a state of fixing a shaft portion of a screw to a sheet by a band.

In the band-shaped connected screws 20 shown in FIG. 1 and FIG. 2, a plurality of the screws 21 are aligned in parallel, and head side portions 21b of the shaft portions 21A of the screws 21 are fixed to the strip sheet 31 by a pair of the bands 30. The band 30 and the sheet 31 are made of a resin and the screws 21 are fixed to the sheet 31 by welding both end portions of the bands 30 to the sheet 31. Further, the screws 21 are arranged at an inclined angle to a longitudinal direction of the sheet 31.

Figure 3:
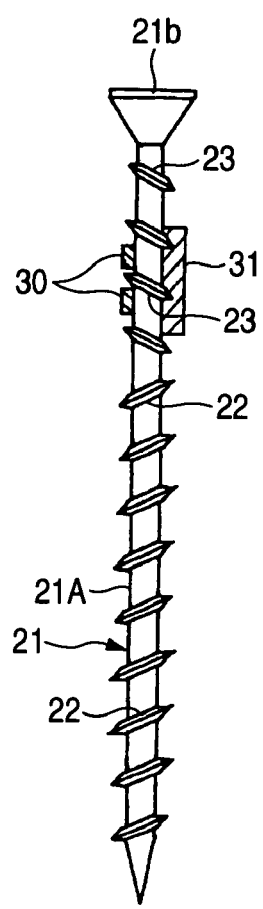
FIG. 3(a) is an explanatory view showing a state in which the band is brought to between screw threads of a screw.
FIG. 3(b) is an explanatory view showing a state in which the band rides over the screw thread.
FIG. 3(c) is an explanatory view showing a state in which the band rides over a head portion of the screw.
Figure 3:
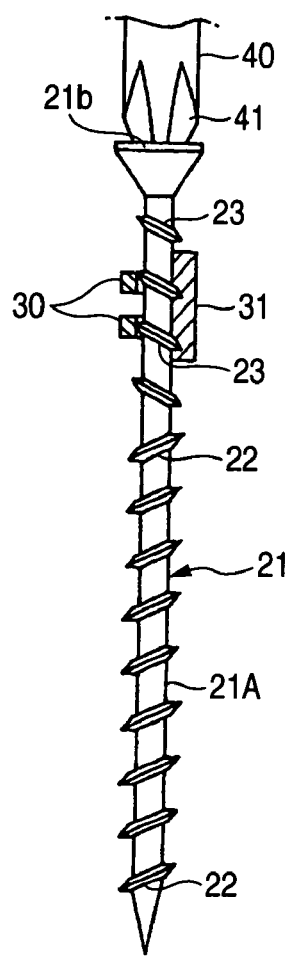
Figure 3:
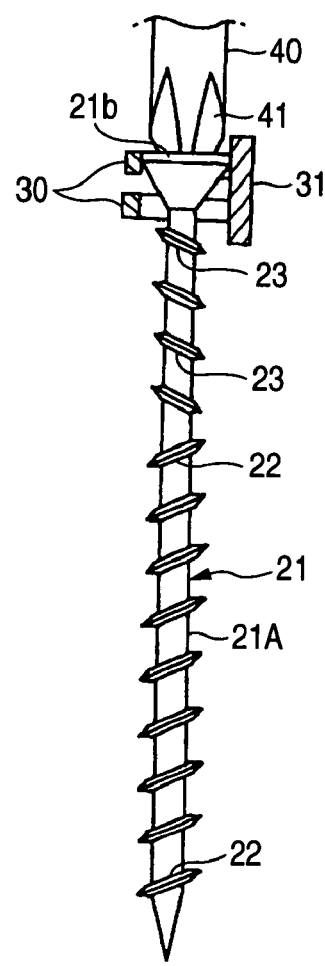

At the shaft portion 21A of the screw 21, as shown by FIG. 3(a), the screw thread 22 of a right-handed screw (Z-shaped screw) is formed from a front end (lower end in the drawing) thereof to a position of a substantially ⅔ height thereof, and the screw thread (inverse screw thread, S-shaped screw) 23 in a direction inverse to that of the screw thread 22 is formed at an upper portion (in the drawing) of the shaft portion 21A. A height of the screw thread 23 is set to be lower than a height of the screw thread 22 and a pitch of the screw thread 23 is set to be smaller than a pitch of the screw thread 22.

Further, as shown by FIG. 3(a), the band 30 is brought to an interval between the screw thread 23 and the screw thread 23 to thereby prevent the screw 21 from shifting in an up and down direction relative to the sheet 31.

Next, an explanation will be given of operation of the band-shaped connected screws 20 constituted as described above.

A driver 40 (refer to FIGS. 3(b) and 3(c)) of a screw striker (not illustrated) is rotated and a bit 41 is engaged with a cross groove (not illustrated) of the head portion 21b of the screw 21 of the band-shaped connected screws 20 to thereby rotate the screw 21. The driver 40 advances while rotating and presses the screw 21 to a lower side (in FIG. 1). Further, as shown by FIG. 3(b), the band 30 rides over the screw thread 23 and the band 30 is elongated while riding over the screw thread 23.

Figure 4:
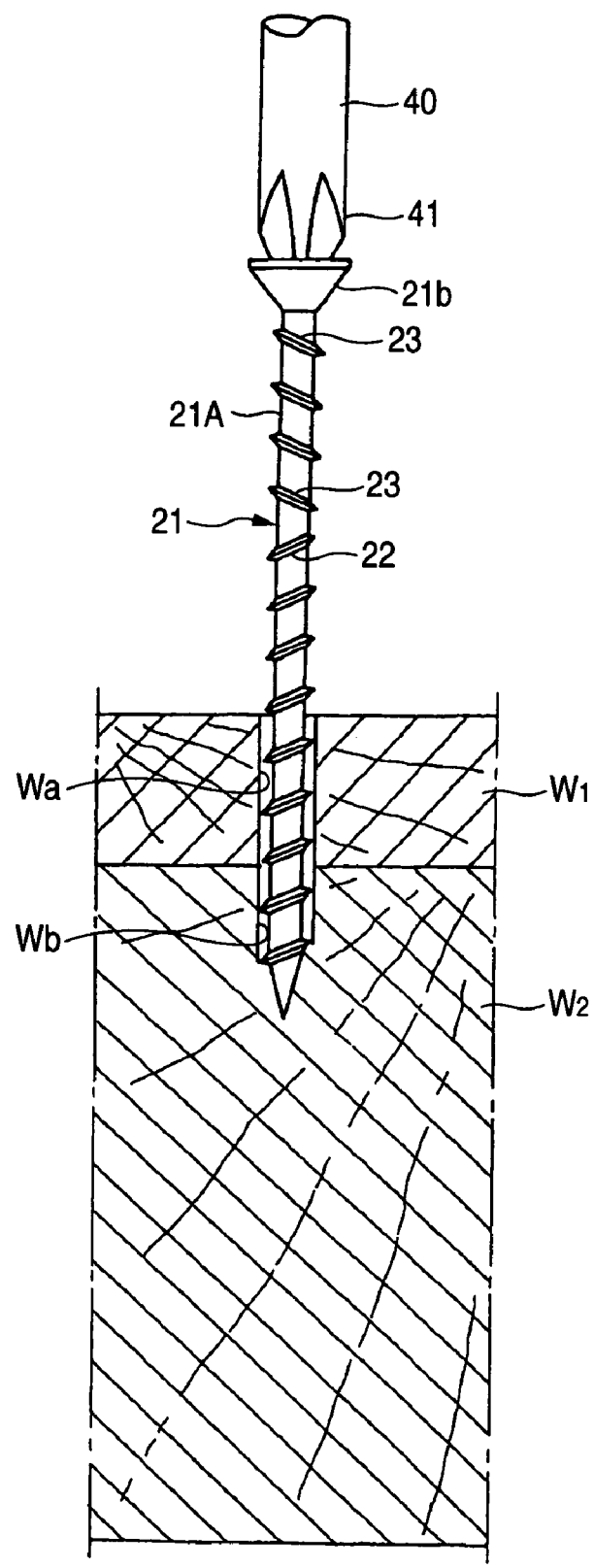
FIG. 4 is an explanatory view showing a state in which the screw is going to be screwed to a plate member.

Further, when the driver 40 advances while rotating, as shown by FIG. 3(c), the band 30 rides over the head portion 21b of the screw 21 and at this occasion, the band 30 is cut and the screw 21 is detached from the sheet 31 and is going to be screwed to plate members (member) $W_1$, $W_2$ as shown by FIG. 4.

When the band 30 is cut, the band 30 has already been elongated and therefore, a load of the screw 21 for cutting the band 30 can be reduced.

Figure 5:
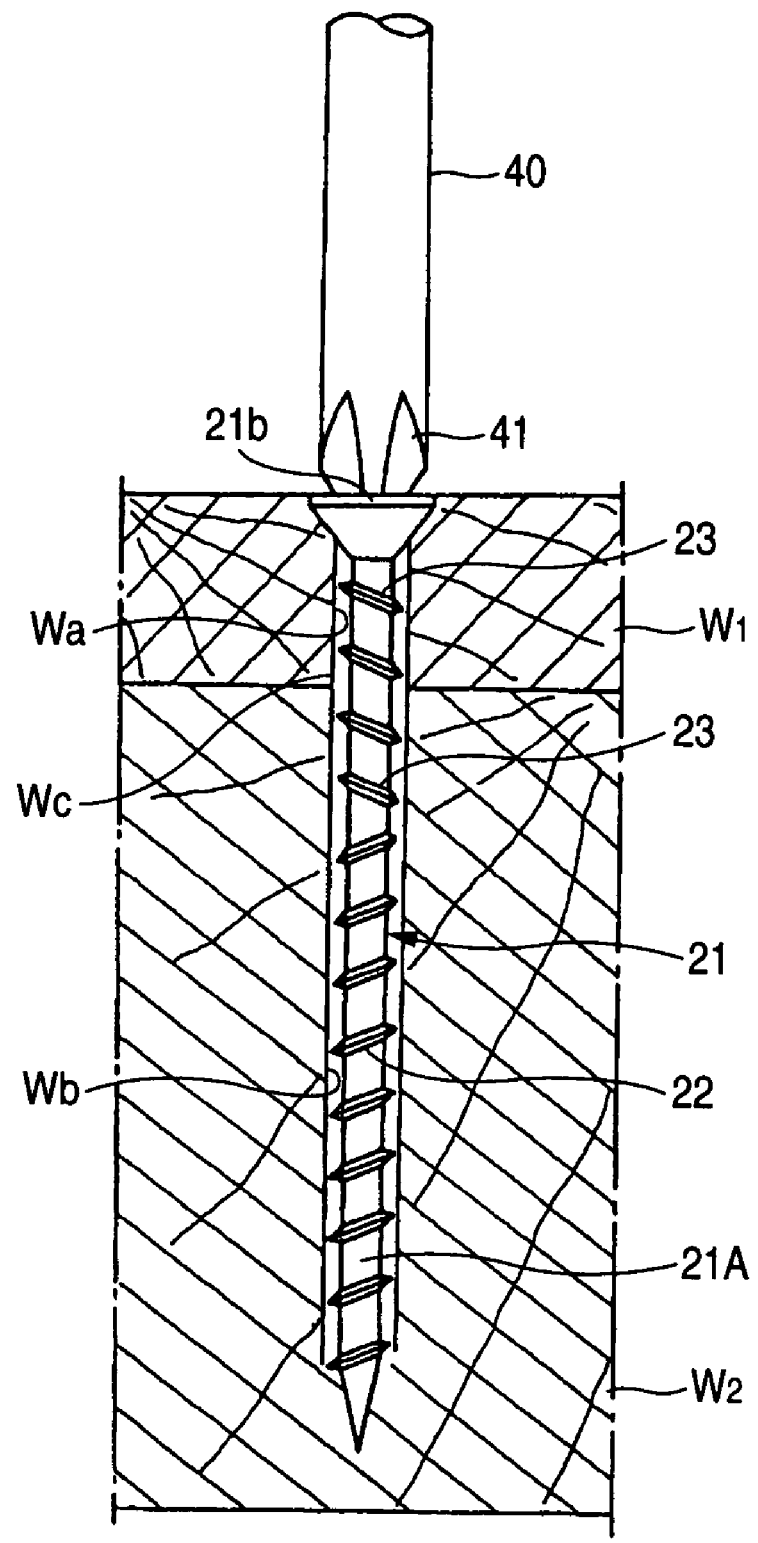
FIG. 5 is an explanatory view showing a state in which the screw has been screwed to the plate member.

In screwing the screw 21 to the plate members $W_1$, $W_2$, screw threads Wa, Wb of female screws are going to be formed in the works $W_1$, $W_2$ by the screw thread 22 of the screw 21. Directions of the screw threads Wa, Wb are the same as each other and pitches thereof are the same. Further, when the screw 21 has been screwed to the works $W_1$, $W_2$ as shown by FIG. 5, since the screw thread 23 of the screw 21 is directed inversely to the screw thread 22, the screw thread 23 destructs the screw thread Wa of the work $W_1$. Therefore, the work $W_1$ is formed with an unscrewed hole Wc. Further, by screwing the screw 21 to the work $W_2$, the head portion 21b of the screw 21 is brought into the unscrewed hole Wc to thereby attract the work $W_1$ to the work $W_2$, and the performance of bringing the works $W_1$, $W_2$ into close contact with each other is improved.

Further, according to the band-shaped connected screws 20 of the embodiment, the screws 21 are arranged at an inclined angle to the longitudinal direction of the sheet 31 and therefore, the screws 21 can closely be arranged and therefore, space saving formation can be achieved and also the portability is improved.

Figure 6:
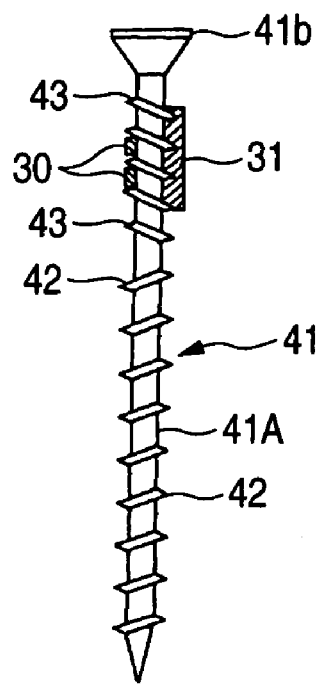
FIG. 6 is an explanatory view showing a screw of other embodiment.

FIG. 6 shows a screw 41 of other embodiment. According to the screw 41, a pitch of a screw thread 43 thereof is made to be smaller than a pitch of a screw thread 42. According to the embodiment, since the pitch of the screw thread 43 becomes smaller than the pitch of the screw thread 42, in screwing the screw 41 to the works $W_1$, $W_2$, the screw thread Wa (refer to FIG. 5) formed by the screw thread 42, can firmly be destructed and the unscrewed hole Wc can firmly be formed. Further, by increasing the pitch of the screw tread 42, the performance of bringing the works $W_1$, $W_2$ into close contact with each other is improved.

Figure 7:
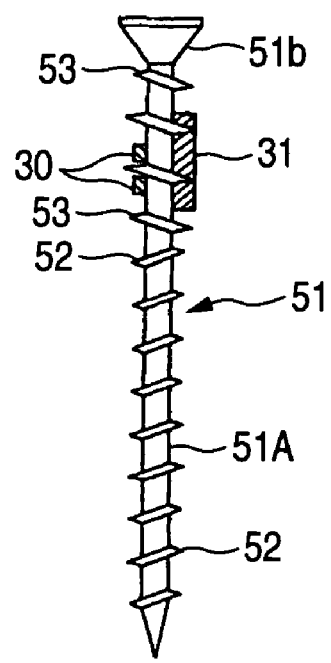
FIG. 7 is an explanatory view showing a screw of still other embodiment.
Figure 8:
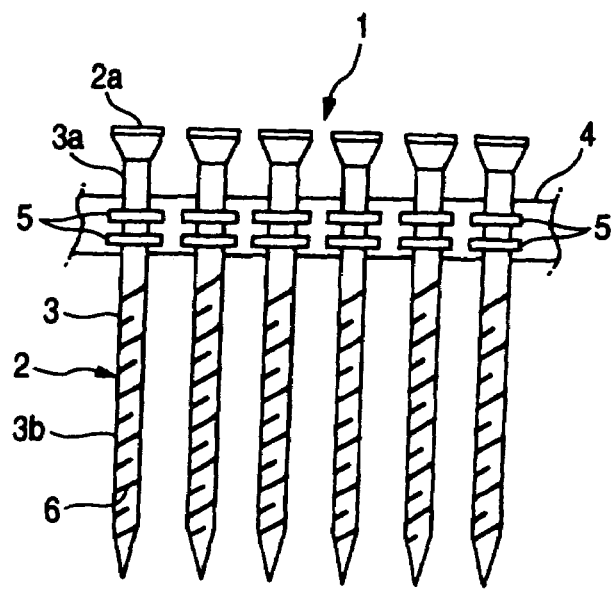
FIG. 8 is an explanatory view showing a constitution of band-shaped connected screws of a related art.
Figure 9:
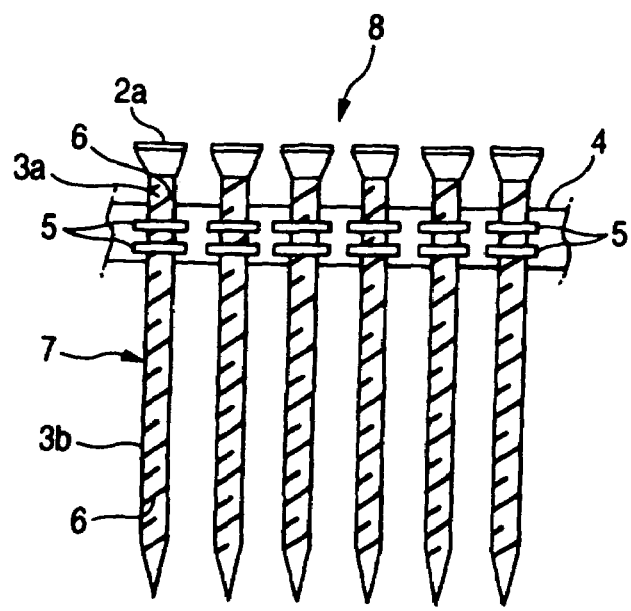
FIG. 9 is an explanatory view showing a constitution of other band-shaped connected screws of a related art.
Figure 10:
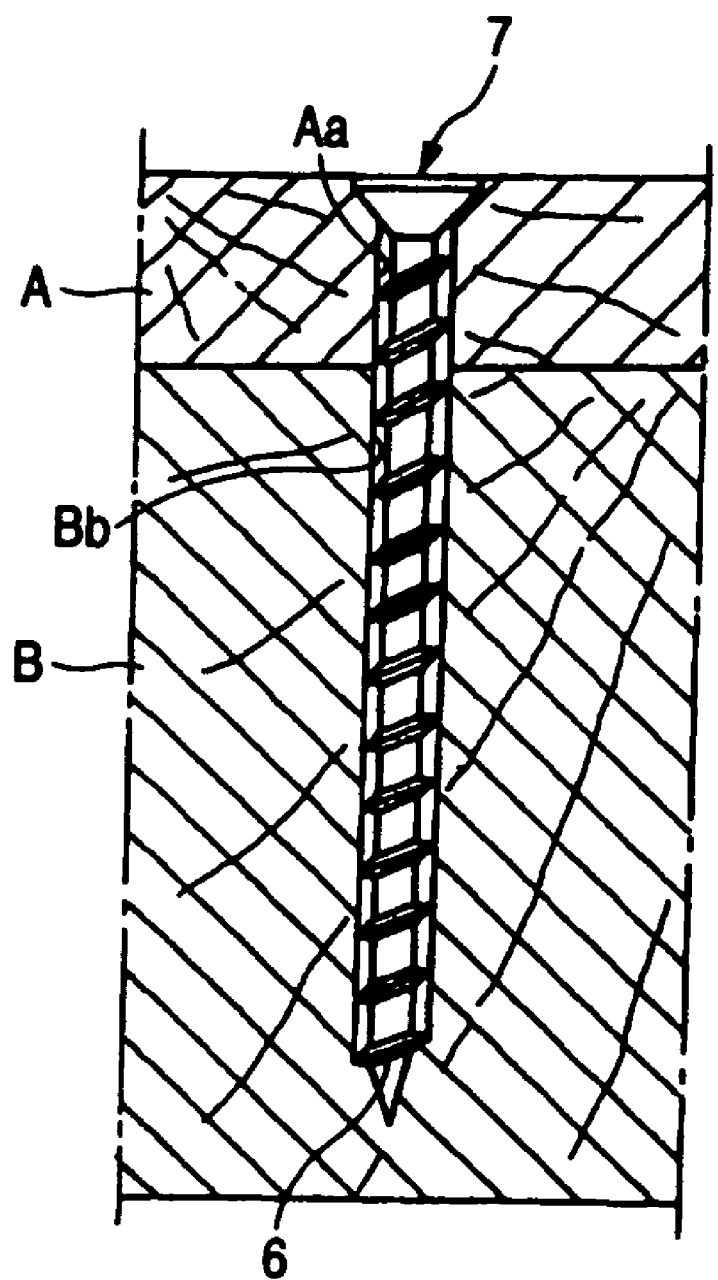
FIG. 10 is an explanatory view showing a state in which a screw is screwed to two members.

FIG. 7 shows a screw 51 of other embodiment. According to the screw 51, a height of a screw thread 53 is made to be higher than a height of a screw thread 52. According to the embodiment, since the height of the screw thread 53 is higher than the height of the screw thread 52, in screwing the screw 51 to the works $W_1$, $W_2$, the screw thread Wa (refer to FIG. 5) formed by the screw thread 52 is destructed by the screw thread 53 and a diameter of the unscrewed hole Wc is formed to be large. Therefore, an effect of the unscrewed hole Wc is promoted and the performance of bringing the works $W_1$, $W_2$ into close contact with each other is improved.

Further, when a pitch of the screw thread 53 is made to be smaller than a pitch of the screw thread 52, the screw thread Wa can firmly be destructed and further, the performance of bringing the works $W_1$, $W_2$ into close contact with each other can further be promoted by increasing the diameter of the unscrewed hole Wc.

The invention is not limited to the above-described embodiments but can variously be modified within the technical range of the invention and the invention naturally covers the modified constitution.

The application is based on Japanese Patent Application (Japanese Patent Application No. 2001-289424) filed on Sep. 21, 2001 and content thereof is incorporated by reference.

INDUSTRIAL APPLICABILITY

As has been explained above, according to the invention, the load in cutting the band for fixing the screw to the sheet can be reduced and the performance of bringing the two members into close contact with each other can be improved.

The invention claimed is:

1. Band-shaped connected screws comprising:
   a plurality of screws aligned in parallel with each other;
   a strip sheet that connects the screws; and
   a band for fixing head side portions of shaft portions of the screws to the strip;
   wherein the head side portion of the shaft portion of each screw includes an inverse screw thread formed inverse to the direction of a screw thread formed at the shaft portion;
   wherein the band is brought into an interval between the inverse screw threads,
   wherein the plurality of screws are arranged at an inclined angle to a longitudinal direction of the strip sheet which is arranged on a reverse side of the screws, and
   wherein the band is arranged on an obverse side of the screws and extends upward from left to right; and
   each of the inverse screw threads extends downward from left to right, relative to the shaft portions of the screws extending in an up-down direction, on the obverse side.

2. The band-shaped connected screws according to claim 1, wherein a pitch of the inverse screw thread is smaller than a pitch of the screw thread.

3. The band-shaped connected screws according to claim 1, wherein a height of the inverse screw thread is lower than a height of the screw thread.

4. The band-shaped connected screws according to claim 1, wherein a height of the inverse screw thread is higher than a height of the screw thread.

5. The band-shaped connected screws according to claim 4, wherein a pitch of the inverse screw thread is smaller than a pitch of the screw thread.

6. Band-shaped connected screws comprising:
   a plurality of screws aligned in parallel with each other;
   a strip sheet that connects the screws;
   a plurality of upper bands, wherein each of the upper bands is individually provided for each of the screws and both end portions of the each of the upper bands are fixed to the strip sheet by welding;
   a plurality of lower bands, wherein each of the lower bands is individually provided for each of the screws and both end portions of the each of the lower bands are fixed to the strip sheet by welding;
   wherein the head side portion of the shaft portion of each screw includes an inverse screw thread formed inverse to the direction of a screw thread formed at a shaft portion;
   wherein an upper end and a lower end of the each of the upper bands are brought into a single interval between the inverse screw threads, and an upper end and a lower end of the each of the lower bands are brought into another single interval.

* * * * *